United States Patent
Misaku

(10) Patent No.: US 6,335,769 B1
(45) Date of Patent: Jan. 1, 2002

(54) CIRCUIT FOR AUTOMATIC DISCRIMINATION OF AUDIO INTERMEDIATE FREQUENCIES

(75) Inventor: Takeshi Misaku, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/291,533

(22) Filed: Apr. 14, 1999

(30) Foreign Application Priority Data

Apr. 28, 1998 (JP) .......................................... 10-118720

(51) Int. Cl.[7] ............................................... H04N 5/60
(52) U.S. Cl. ..................... 348/738; 348/736; 348/737; 348/558; 455/311
(58) Field of Search ............................... 348/736, 737, 348/738, 554, 555, 558, 484, 485, 486, 536, 537, 547, 735; 455/311; H04N 5/44, 5/60, 5/62

(56) References Cited

U.S. PATENT DOCUMENTS

| | | | |
|---|---|---|---|
| 4,574,308 A | * 3/1986 | Gibson et al. | 348/737 |
| 4,897,723 A | * 1/1990 | Arai | 348/548 |
| 5,083,205 A | * 1/1992 | Arai | 348/555 |
| 5,264,931 A | * 11/1993 | Yamada | 348/725 |
| 5,418,815 A | * 5/1995 | Ishikawa et al. | 455/142 |
| 5,673,088 A | * 9/1997 | Nah | 348/555 |
| 5,995,169 A | * 11/1999 | Hatano | 348/555 |

FOREIGN PATENT DOCUMENTS

JP 6-6691 1/1994

* cited by examiner

Primary Examiner—Michael Lee
Assistant Examiner—Trang U. Tran
(74) Attorney, Agent, or Firm—Merchant & Gould PC

(57) ABSTRACT

A circuit for automatically discriminating audio intermediate frequencies of a received television signal that has a simple, compact and inexpensive circuit structure and can operate stably. The circuit comprises a high pass filter circuit for eliminating a synchronizing signal from an output of a video intermediate frequency detector; a synchronizing signal separation circuit for separating a synchronizing signal from the output of the video intermediate frequency detector; a waveform shaping circuit for shaping a waveform of an output signal of the high pass filter circuit; a counter for counting predetermined clock pulses; a counter controlling circuit, which, triggered by the separated synchronizing signal, (i) causes the counter to count the number of the clock pulses that are contained during a period of time that is defined based on the output of the waveform shaping circuit, and (ii) causes the counter to output a counted value; and a discrimination signal output circuit for discriminating a range, within which the counted value falls, from a plurality of ranges, and outputting a discrimination signal according to the result of the discrimination. The plurality of ranges are partitioned corresponding to audio intermediate frequencies.

5 Claims, 4 Drawing Sheets

CIRCUIT FOR AUTOMATIC DISCRIMINATION OF AUDIO INTERMEDIATE FREQUENCIES

BACKGROUND OF THE INVENTION

1. Field of the Invention

The present invention relates to an electronic circuit for automatically identifying a carrier frequency of an audio signal, that has been separated from a transmitted television signal, from a number of frequencies that differ depending on the type of television system.

2. Description of the Prior Art

Within the presently utilized television systems other than the NTSC system that is used in Japan and United States, are the PAL system used in Germany and the United Kingdom, as well as the SECAM system used in Eastern Europe. The audio intermediate frequencies of these systems may be classified into four types: 4.5 MHz (NTSC), 5.5 MHz (PAL), 6.0 MHz (PAL) and 6.5 MHz (PAL and SECAM).

In order to receive a plurality of television systems, television receivers must have a circuit that can automatically identify which of the above four audio intermediate frequencies a received frequency is. If not, the user must know the differences between the types of television systems and must change the frequencies manually.

A prior art example of this kind of circuit for automatic discrimination of audio intermediate frequencies can be found in Japanese laid-open patent application No. (Toku-Kai-Hei) 6-6691. In this conventional automatic discrimination circuit, the received signal is applied to four bandpass filter circuits, four detecting circuits and four A/D converters, each corresponding to one of the four audio intermediate frequencies. The resulting digital signal is then input into the CPU, which discriminates the most probable of the audio intermediate frequencies. This discrimination is performed with fuzzy logic, based on the input signal level (digital).

However, such a circuit for automatically discriminating intermediate frequencies with fuzzy logic must have a fuzzy logic program and a CPU (microprocessor) executing this program. Consequently, much cost and time for software development are needed, and since a comparatively processing-intensive CPU is needed, the overall cost of the circuit rises.

Furthermore, Japanese laid-open patent application No. (Toku-Kai-Hei) 6-6691 also describes the then prior art in simple terms. In this prior art, as several bandpass filter circuits were necessary to extract each individual audio intermediate frequency, there was a problem in the rise in cost and increase of circuit scale.

SUMMARY OF THE INVENTION

It is an object of the invention to solve these problems of the prior art and provide a circuit for automatic discrimination of audio intermediate frequencies with a comparatively simple circuit structure that can automatically discriminate received audio intermediate frequencies stably, while being compact and inexpensive.

A circuit for automatic discrimination of audio intermediate frequencies in accordance to this invention comprises logic circuits such as counter or decoders, and can automatically discriminate a frequency in a stable manner with a simple circuit.

A circuit for automatic discrimination of audio intermediate frequencies in accordance with the present invention comprises a high pass filter circuit for eliminating a synchronizing signal from an output of a video intermediate frequency detector; a synchronizing signal separation circuit for separating a synchronizing signal from the output of the video intermediate frequency detector; a waveform shaping circuit for shaping a waveform of an output signal of the high pass filter circuit; a counter for counting predetermined clock signals; a counter controlling circuit, which, triggered by the separated synchronizing signal, (i) causes the counter to count the number of the clock signals that are contained in a period of time that is defined based on a period of an output signal of the waveform shaping circuit, and (ii) causes the counter to output a counted value; and a discrimination signal output circuit for discriminating a range, within which the counted value falls, from a plurality of ranges, and outputting a discrimination signal according to the result of the discrimination, the plurality of ranges being partitioned corresponding to audio intermediate frequencies.

In the blanking period in which the synchronizing signal is contained, there is an audio signal, but no video signal (luminance signal and chrominance signal). Therefore, by controlling the counter by using the synchronizing signal as a trigger, a time period that is determined by the audio intermediate frequency can be accurately measured, without signal separation by a filter circuit. Thus, discrimination of the audio intermediate frequency can be performed from this measurement result.

It is preferable that the synchronizing signal used for triggering the counter control is a vertical synchronizing signal. It is also possible to use the horizontal synchronizing signal, but since the vertical blanking period is longer than the horizontal blanking period, the vertical blanking period leaves more time for discriminating the audio intermediate frequency.

It is preferable that the waveform shaping circuit comprises a frequency divider circuit. By counting the period or half-period of the frequency-divided audio intermediate signal with a counter, while using a clock with approximately the same frequency as the audio intermediate signal, adjacent audio intermediate frequencies can be discriminated with precision.

It is preferable that the discrimination signal output circuit comprises a plurality of comparators for comparing said counted value with a plurality of boundary values by which said plurality of ranges are patitioned; and a decoder for decoding an output of said plurality of comparators. Thus, a comparatively simple circuit for outputting a discrimination signal can be realized with regular circuit elements.

It is preferable that the circuit further comprises a latch for latching an output of the decoder. If the output of said decoder indicates that said audio intermediate frequency is not within a predetermined frequency range, then the output of the said latch maintains its output without changing it. In this case, it will be determined that the output is erroneous due the influence of large continuous noise and the operation is stabilized by maintaining the prior discrimination result.

DESCRIPTION OF THE PREFERRED EMBODIMENT

Figure 1:
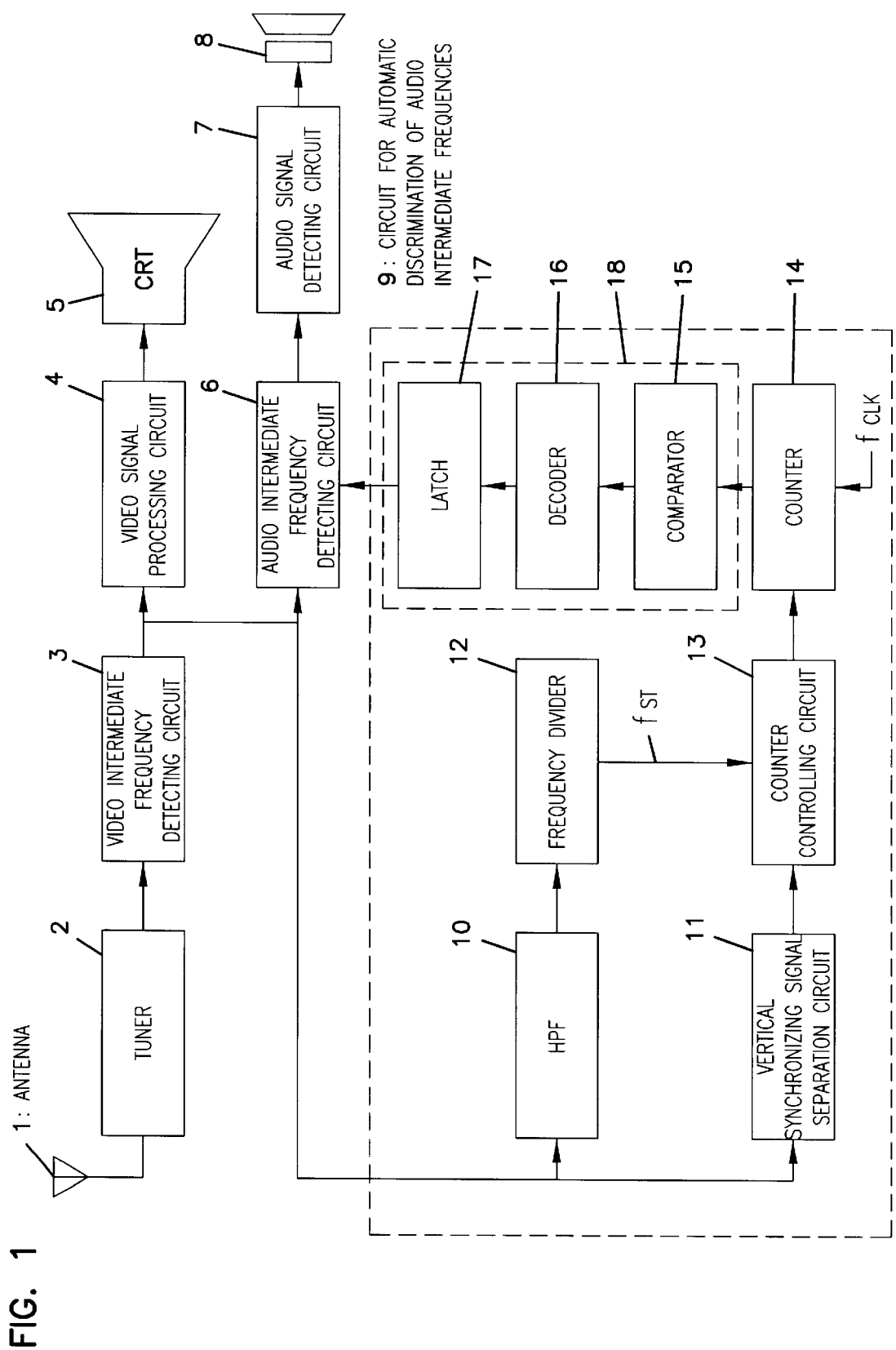
FIG. 1 is a block diagram of a television receiver including a circuit for automatic discrimination of audio intermediate frequencies according to an embodiment of this invention.

FIG. 1 shows a block diagram of a television receiver comprising a circuit for automatic discrimination of audio intermediate frequencies according to an embodiment of this invention. In FIG. 1, a high frequency signal received by an antenna 1 is selected by a tuner 2 and detected by a video intermediate frequency detecting circuit 3. As a result, the video intermediate frequency detecting circuit 3 outputs a superimposed signal of a composite video signal (the so-called "composite signal") and an audio intermediate frequency signal. The composite video signal includes a video signal consisting of a luminance signal, a chrominance signal and horizontal and vertical synchronizing signals.

In regard to the composite video signal, a video signal processing circuit 4 amplifies the luminance signal and demodulates the chrominance signal, etc., and the image is displayed in a television picture tube (CRT) 5. At the same stage, the horizontal and the vertical synchronizing signals are separated, and the driving signal for the deflection system is generated. Also, the audio intermediate frequency signal that is superimposed on the composite video signal is FM detected by an audio intermediate frequency detecting circuit 6, the output therefrom is amplified by an audio signal processing circuit 7, and the output audio signal is supplied to a speaker 8.

The audio intermediate frequency detecting circuit 6 should correspond to the various television systems, and its configuration is such that it can process four intermediate frequencies, namely 4.5 MHz (NTSC), 5.5 MHz (PAL), 6.0 MHz (PAL), and 6.5 MHz (PAL and SECAM). In other words, depending on these intermediate frequencies, the bandpass filter circuit as well as the center frequency of the detecting circuit can be changed. Since a conventional switching circuit can be used for this, its explanation has been omitted.

In FIG. 1, block 9, which is enclosed in the broken line, is a circuit for automatic discrimination of audio intermediate frequencies according to this invention. The circuit for automatic discrimination of audio intermediate frequencies 9 automatically discriminates which of the above-mentioned four frequencies is currently being received as an audio intermediate frequency, and passes a discrimination result signal to the audio intermediate frequency detecting circuit 6. Based on the signal from the circuit for automatic discrimination of audio intermediate frequencies 9, the audio intermediate frequency detecting circuit 6 changes the bandpass filter circuit and the detecting circuit's center frequency.

As shown in FIG. 1, the output of the video intermediate frequency detector 3 is also supplied to the circuit for automatic discrimination of audio intermediate frequencies 9, and is fed to a high pass filter circuit (HPF) 10 as well as to a vertical synchronizing signal separation circuit 11. FIG. 2(a) shows a signal waveform of the output of the video intermediate frequency detector 3 and FIG. 2(b) shows the signal waveform after passing the high pass filter circuit 10. The output signal of the high-pass filter circuit 10 is such that low frequency components of the synchronizing signal are removed from the output of the video intermediate frequency detector 3. In this example, the cut off frequency of the high-pass filter circuit 10 was set to 1 MHz. As for the synchronizing signal separation circuit 11, the vertical synchronizing signal is separated from the output of the video intermediate frequency detector, as shown in FIG. 2(c).

The output signal of the high-pass filter circuit 10 is supplied to the frequency divider 12. The frequency divider 12 lowers the frequency of the signal that is the output from the high-pass filter circuit 10 (or in other words, it lengthens its period), and shapes the waveform of the signal into a rectangular waveform. In this example, a 1/128 (7 bit) frequency divider is used. The output of the frequency divider 12 (frequency $f_{ST}$) is given to a counter controlling circuit 13 as well as a counter 14.

The output of the vertical synchronizing signal separation circuit 11, that is the vertical synchronizing signal shown in FIG. 2(c), is supplied to the counter controlling circuit 13. Triggered by the synchronizing signal, the counter controlling circuit 13 controls the start and stop of a counter 14 (in other words, the restart and counted value output) in order to measure half the cycle of the output signal of a frequency divider 12 (H Level portion), that is 1/2 $f_{ST}$. The counter 14 is supplied with a clock signal with a frequency of $f_{CLK}$. For instance, a clock signal of 17.734475 MHz, which corresponds to four times the PAL system's burst signal frequency of 4.43361875 MHz, can be used.

Figure 2:
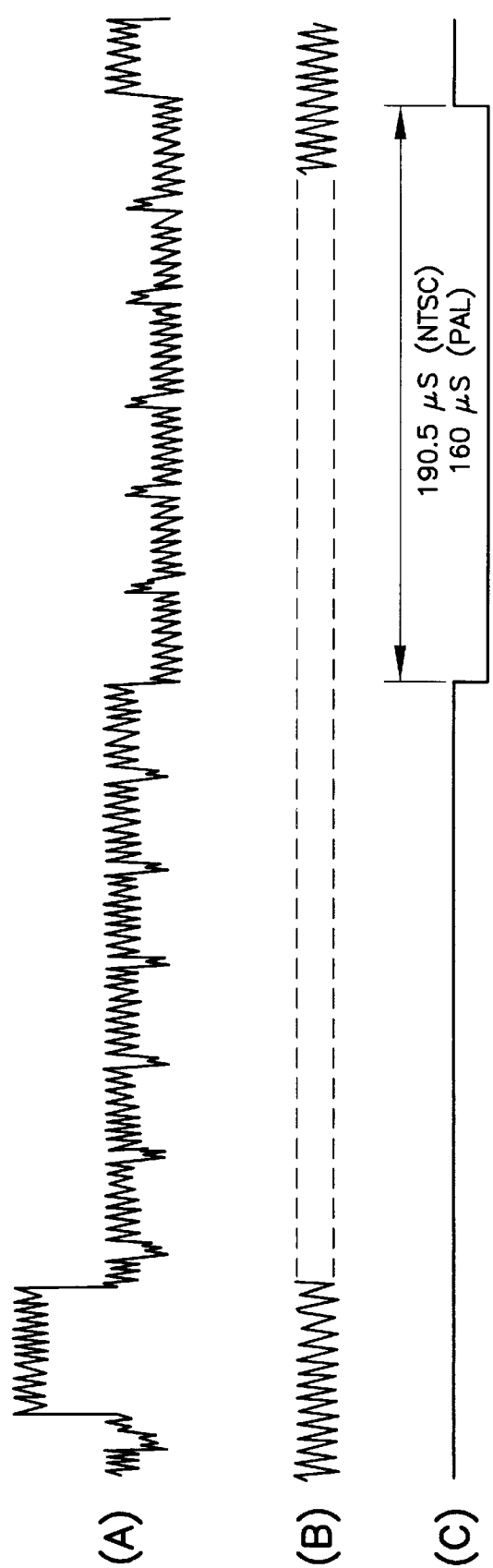
FIG. 2 is a view of a signal waveform illustrating the operation of the circuit for automatic discrimination of audio intermediate frequencies.
Figure 3:
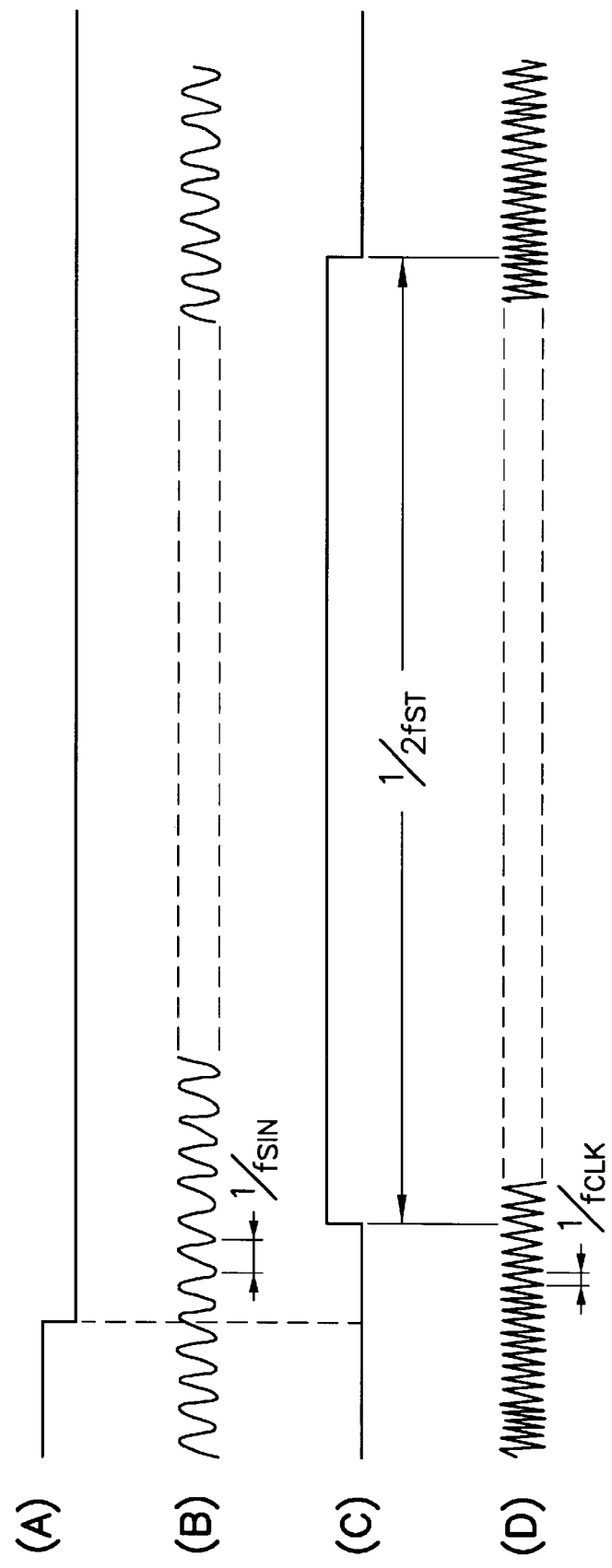
FIG. 3 is a view of another signal waveform illustrating the operation of the circuit for automatic discrimination of audio intermediate frequencies.

FIGS. 3(a) to (d) show signal waveforms related to the operation of the counter 14 and the counter controlling circuit 13. The scale of the time axis (horizontal axis) is magnified compared to the time axis used in FIG. 2. FIG. 3(a) is the vertical synchronizing signal as shown in FIG. 2(c). Here, only the falling part at the beginning of the synchronizing signal is shown. FIG. 3(b) shows the output signal of the high-pass filter circuit 10. Since there is no video signal in the environs of the vertical synchronizing signal, or in other words, in the vertical blanking period, the signal shown in FIG. 3(b) is nearly identical to the audio intermediate frequency signal. If the frequency of the audio intermediate frequency signal is $f_{SIN}$ (for example, 4.5 MHz), its period is $1/f_{SIN}$ (for example, 222 nsec).

The signal shown in FIG. 3(c) is the output signal of the frequency divider 12. If this frequency is $f_{ST}$, then its period is $1/f_{ST}$. FIG. 3(c) shows the waveform for the H level time period, or the period of $1/(2f_{ST})$ corresponding to a half period. If the frequency $f_{SIN}$ of the audio intermediate frequency signal is 4.5 MHz, and the dividing ratio of the frequency divider 12 is 1/128, then the period 1/(2 $f_{ST}$) is 14.2 μsec.

The signal shown in FIG. 3(d) is the clock signal supplied to the counter 14. If its frequency is $f_{CLK}$ (for example, 17.734475 MHz), the period is $1/f_{CLK}$ (56.4 nsec).

The counter controlling circuit 13, triggered by the vertical synchronizing signal shown in FIG. 3(a), controls the counter 14 so as to start to count the number N of the clock signals (period $1/f_{CLK}$) included in period of 1/2 $f_{ST}$ shown in FIG. 3(c), and then outputs the counted value N. That is, after detecting the falling of the vertical synchronizing signal, the counter 14 is started (or restarted) when output signal of the frequency divider in FIG. 3(c) rises for the first time, and when the frequency divider output signal falls, the counter 14 is stopped and is made to output the counted value N.

If the dividing ratio of the frequency divider 12 is 1/K, then the counted value N should be $N = f_{CLK}/2 f_{ST} = K \cdot f_{CLK}/2 f_{SIN}$ wherein N is an integral number and numbers to the right of the decimal point are rounded off. For example, when $f_{CLK}$=17.734475 MHz and K=128, then the counted value N is 252 if the audio intermediate frequency $f_{SIN}$ is 4.5 MHz. Under the same conditions if the audio intermediate frequency $f_{SIN}$ is 5.5 MHz, 6.0 MHz, or 6.5 MHz, the counted value N becomes 206, 189 or 174, respectively.

Thus, if as to these counted values N, boundary values are set near the median of the counted values for two adjacent audio intermediate frequencies, and if it is examined into which of the resulting four ranges the counted value N falls, it then can be determined which audio intermediate frequency $f_{SIN}$ is currency received. In the above-mentioned example, since the counted values for two adjacent audio intermediate frequencies are sufficiently separated, even if there is a calculation discrepancy due to a change of the surrounding temperature or the operating voltage or due to noise, it is possible to obtain the correct result. As shown in FIG. 1, a comparator circuit 15, a decoder 16 and a latch 17 construct a discrimination signal output circuit 18 for performing this judgement and supplying the audio intermediate frequency detecting circuit 6 with a discrimination signal.

Figure 4:
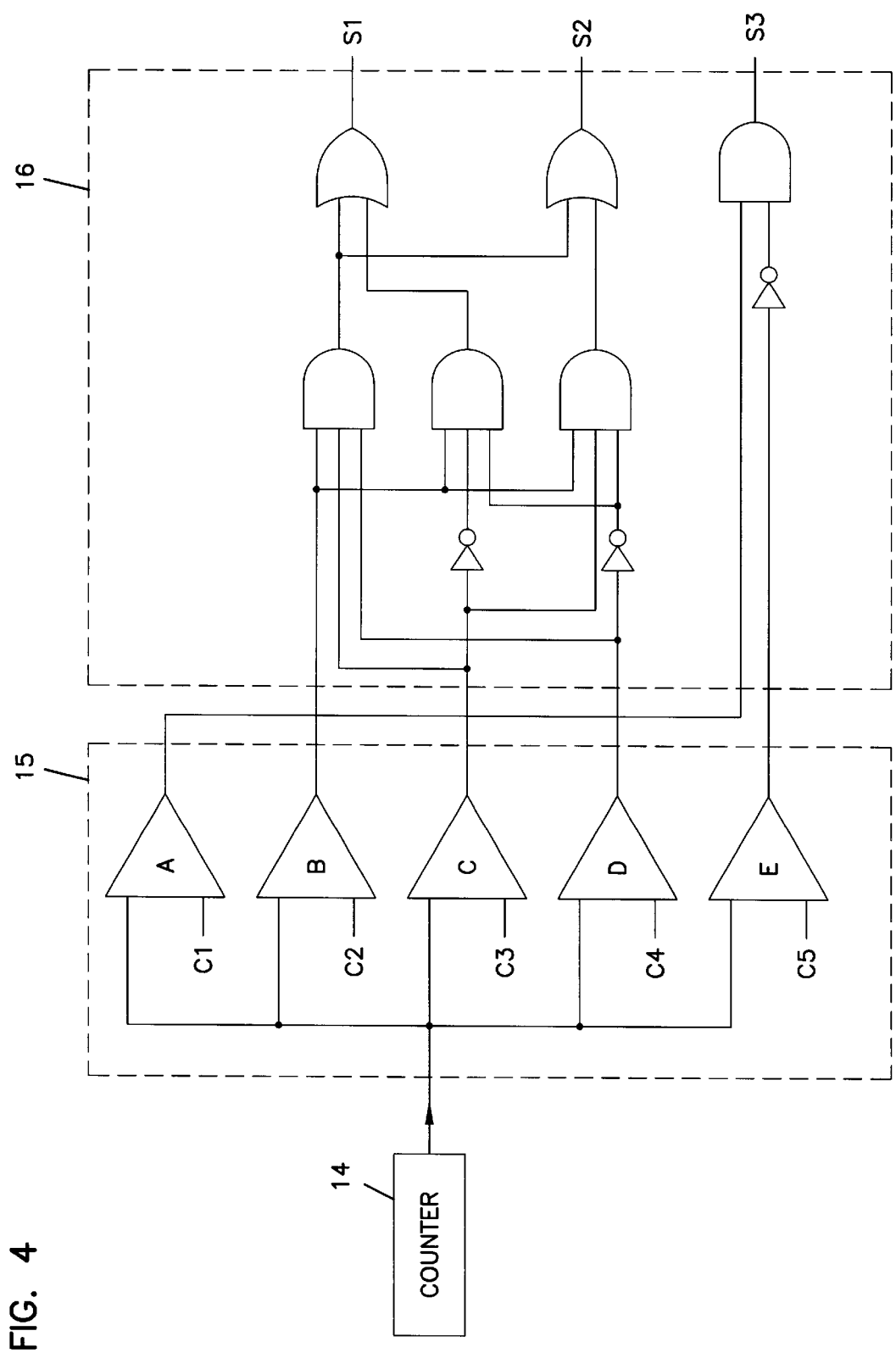
FIG. 4 is a circuit diagram of the comparator circuit and decoder that forms the circuit for automatic discrimination of audio intermediate frequencies.

FIG. 4 shows a specific example of the comparator circuit 15 and the decoder 16. The output of the counter 14, or in other words, the counted value N, is supplied to five comparators A–E which form the comparator circuit 15. The five comparators A–E compare the counted value N with the individually set values C1 to C5, and if the counted value N is higher than the set values of C1 through C5, then the output is H level, or if it is lower than the set values of C1 through C5, then the output is L level. The set levels C2 to C4 are the three boundary values that divide the four ranges, as stated before. The set value C1 is the lower limit of the range that corresponds to the counted value for the highest audio intermediate frequency $f_{SIN}$. The set value C5 is the highest limit of the range that corresponds to the counted value for the lowest audio intermediate frequency $f_{SIN}$. The set values C1 and C5 are provided to detect an undesirable condition where, due to large continuous noise, etc., the value N deviates largely from the range which corresponds to the audio intermediate frequency, and take appropriate measures in this case. This particular subject will be explained later.

In FIG. 4, the comparator circuit is configured using the comparators A through E. There is no need to convert the counter signal into an analog voltage for the comparison, and the comparison of the counted value N with the set values C1 to C5 can be performed by software. The counter 14 can be configured to have built-in comparator circuit 15 and to reverse the corresponding outputs to Level H whenever the internal counted value exceeds one of the set values C1 to C5.

The set values of C1 through C5 can be as follows: For example, if the audio intermediate frequencies $f_{SIN}$ to be discriminated are the four frequencies 6.5 MHz, 6.0 MHz, 5.5 MHz and 4.5 MHz, as in the numerical example mentioned above, the set values of C1 through C5 can be set to 166, 182, 198, 230, and 270, because the counted values of N should be 174, 189, 206, and 252.

The decoder 16 outputs two-bits signal of S1 and S2, which are generated by processing the output signals from the three comparators B, C and D and give information concerning the four frequencies. The decoder 16 also outputs one-bit signal S0 generated by processing the output of the two comparators A and E and shows whether the audio intermediate frequency is within the predicted frequency range or not. If, due to large continuous noise, for example, the value N considerably drops below C1 or exceeds C5 to a large extent, the signal S0 becomes L Level. Under a normal condition, signal S0 becomes H level. The function of decoder 16 is expressed in Table 1 as a truth table.

TABLE 1

| Case | Comparator Output | | | | | Decoder Output | | |
| --- | --- | --- | --- | --- | --- | --- | --- | --- |
| | A | B | C | D | E | S2 | S1 | S0 |
| 1 | L | L | L | L | L | L | L | L |
| 2 | H | L | L | L | L | L | L | H |
| 3 | H | H | L | L | L | L | H | H |
| 4 | H | H | H | L | L | H | L | H |
| 5 | H | H | H | H | L | H | H | H |
| 6 | H | H | H | H | H | H | H | L |

In Table 1, Case 1 means that the determined result of the audio intermediate frequency is higher than the upper limit of predetermined frequency range (N is smaller than C1). In Case 6, the audio intermediate frequency is lower than the lower limit of the predetermined frequency range (N is larger than C5). In Case 2, N ranges between C1 and C2, and in the previously mentioned numerical example, the audio intermediate frequency is determined as 6.5 MHz. In Case 3, N ranges between C2 and C3, and in previously mentioned numerical example, the audio intermediate frequency is determined as 6.0 MHz. In Case 4, N ranges between C3 and C4, and in the previously mentioned numerical example, the audio intermediate frequency is determined as 5.5 MHz. In Case 5, N ranges between C4 and C5, and in the previously mentioned numerical example, the audio intermediate frequency is determined as 4.5 MHz.

The latch 17 receives the output signals S1, S2, and S0, which correspond to the discriminant result of the audio intermediate frequency of the decoder 16, and outputs the signals FRQ1 and FRQ2, which are identical to the signals S1 and S2 output by the latch 17. However, if the output signal S0 of the decoder 16 has the Level L, the latch output is maintained regardless of the values of S1 and S2. In this case, it is determined that an error has been made wherein the value N is completely off track due to large continuous noise as previously mentioned, and the previously determined result is maintained. Thus, operation errors, due to noise for example, can be avoided and the operation is stabilized.

In regard to the previously mentioned numerical example, Table 2 shows the relation between the determined result of the audio intermediate frequency and the latch output signals FRQ 1 and FRQ 2.

TABLE 2

| Determined Frequency (MHz) | 6.5 | 6.0 | 5.5 | 4.5 |
| --- | --- | --- | --- | --- |
| FRQ 1 | L | H | L | H |
| FRQ 2 | L | L | H | H |

The output signal of the latch 17, or in other words, the output signals FRQ 1 and FRQ 2 of the circuit 9 for automatic discrimination of audio intermediate frequencies are applied to the audio intermediate frequency detecting circuit 6. This audio intermediate frequency detecting circuit 6 switches the bandpass filter circuit and the center frequency of the detecting circuit in accordance with those signals.

In this embodiment, the frequency divider 12 is not always necessary, and it is possible to substitute it with a simple waveform shaping circuit. However, in this case, it is necessary to use a clock with a particularly high frequency for the clock of the counter 14, and fast circuits must be used for the other processing circuits. In addition, the specific circuits that form the circuit for automatic discrimination of audio intermediate frequencies of this invention are not limited to the configurations shown in this embodiment, and other configurations using prior art technology can be used As explained above, the circuit for automatic discrimination of audio intermediate frequencies according to the present invention, while being compact and inexpensive, has a comparatively simple circuit structure using logic circuits such as counters and decoders, and can automatically discriminate the audio intermediate frequency that is currently being received.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A circuit for automatic discrimination of audio intermediate frequencies comprising:

a high pass filter circuit for eliminating synchronizing signals from a video intermediate frequency detecting output;

a synchronizing signal separation circuit for separating synchronizing signals from said video intermediate frequency detecting output;

a waveform shaping circuit for shaping a waveform of an output signal of said high pass filter circuit;

a counter for counting clock pulses;

a counter controlling circuit, which, triggered by the separated synchronizing signals, (i) causes said counter to count said clock pulses held in a period of time defined by a period of said waveform shaping circuit output signal and (ii) causes said counter to output a counted value; and a discrimination signal output circuit outputting a plural kind of signals according to a partitioned range within which said counted value falls, said plurality of ranges being partitioned corresponding to said audio intermediate frequencies.

2. A circuit according to claim 1, wherein said synchronizing signal separation circuit separates a vertical synchronizing signals; and said counter controlling circuit triggered by said separated vertical synchronizing signals controls said counter.

3. A circuit according to claim 1, wherein said waveform shaping circuit comprises a frequency divider circuit.

4. A circuit according to claim 1, wherein said discrimination signal output circuit comprises:

a plurality of comparators for comparing said counted value with a plurality of boundary values by which said plurality of ranges are partitioned; and a decoder for decoding an output signal of said plurality of comparators.

5. A circuit according to claim 4, further comprising a latch for latching an output signal of said decoder, wherein, if the output signal of said decoder indicates that said audio intermediate frequency is not within a predetermined frequency range, then said latch maintains its output without changing it.

* * * * *